Aug. 4, 1964 G. C. FAGERT ETAL 3,143,156
TIRE REPAIR
Filed April 9, 1962

United States Patent Office 3,143,156
Patented Aug. 4, 1964

3,143,156
TIRE REPAIR
George Clarke Fagert, Cuyahoga Falls, and Robert D. Murphy, North Canton, Ohio, assignors to The Firestone Tire & Rubber Company, Akron, Ohio, a corporation of Ohio
Filed Apr. 9, 1962, Ser. No. 186,171
25 Claims. (Cl. 152—370)

The present invention is directed to a novel tire repair structure, and to a means and method for producing such a repair.

More specifically, the invention is concerned with composite repairs, particularly, for example, through the tread and shoulder areas of large tires such as truck and off-the-road tires. Successful repairs of tires in the above sizes is of the utmost importance, due to the high cost of acquisition and retreading of these large and specialized tires.

When large and heavy tires are damaged, two problems must be faced: the physical opening through the tire must be filled with rubbery material, and the strength lost through damage to the tire cord body must be replaced by other means.

It has been conventional practice for many years to excise or "skive" the damaged area quite severely, both from the tread surface of the tire inwardly and from the inner tire surface outwardly. These skives were, of necessity, made at substantial angles to the tire surfaces, so as to present relatively large areas suitable for receiving the layers of unvulcanized repair material which were to fill the repair opening. Cross-sections through the repair area would thus exhibit radially outwardly opening V- or Y- or hourglass-shaped configurations. In addition to the rubber "plug" thus formed layer-by-layer in the gaping opening of the repair, strength was given the repair by centering over the area an unvulcanized cord fabric-and-rubber patch of substantial size.

To vulcanize the repair into the tire, it is conventional practice to utilize sectional tire molds, heated by a steam generator, which engage the exterior of the tire quadrant, while interior heat and pressure are supplied by a partial, rubbery vulcanizing member known as a sectional airbag, which engages the tire-interior in the corresponding quadrant. Heat, pressure and time thus combine to vulcanize the repair into place.

Grave problems attend the use of this type of repair and the method and apparatus for producing it, however: the equipment for producing repair by the sectional mold method, including steam generators, is cumbersome and very expensive, thus precluding use in anything but a completely equipped shop and denying use of the method at or conveniently near job-sites. This is a particular disadvantage, since off-the-road tires are often used, and need repairs, in remote and inaccessible areas.

Further, the sectional-mold type of repair has many disadvantages: the conventional method is quite time-consuming and produces a repair of large size; and the larger the repair size, the greater the loss of strength in the tire. Additionally, large patches increase the rate of heat buildup in the area during service.

At best, the sectional mold used only approaches in fit the tire which it receives. Tires vary in size, type of tread design, degree of wear, number of reinforcing plies, and sectional molds must therefore be used which approximate a match with the tire, since maintaining different molds to cover all variations would be prohibitively expensive. As a result of this approximate fit, the tire generally becomes distorted in the repair area during the vulcanization.

Further, this conventional method applies liberal amounts of vulcanizing heat both externally of the tire, from the sectional tire mold, and internally, from the steam-heated bag. While this heat vulcanizes the repair, it also subjects the remainder of the already vulcanized tire portions to overdoses of heat, the results of which may show up later during service in the form of premature cracking of the rubber stock. Where the tire body comprises certain types of synthetic cord materials, this heat tends to shrink the adjacent portions of the cord material, thus distorting the tire. As to the use of other types of tire body cord material, it is well-known that excessive heat leads to early cord deterioration.

The conventional repair patch, which replaces strength lost by the injured tire by means of cord fabric reinforcement in the patch, is of large area in the conventional repair, since it must adequately cover and surround a large skived repair area. For this reason, such patches are generally reinforced with layers of relatively heavy-gauge material each comprised of parallel cords. Where the rubber of the patch tapers to a fine edge beyond the cord ends, flexing and straining of the tire and of the repair generally results in premature failure due to separation of the patch from the tire.

Attempts to utilize large-size patching material of lighter-gauge materials, such as, for example, square-woven nylon, have been unsuccessful, since the very fact of its lighter construction causes the patch to "sink" into the concavity which tends to form on the inside of the tire at the center of the repair area during the vulcanization process. As the tire rotates in service, this depressed area in the repair area flexes alternately inwardly and outwardly, leading to premature repair failures around the edge of the concavity.

As to the rubbery repair material itself, which extends through the tire injury, it has been found that the conventional X and Y and also the outwardly opening V types separate from the walls of the repair somewhere near the middle of the tire thickness and eventually pop out; this condition is particularly acute with the X and Y types, in which a hinge point is present at the juncture where the skive changes direction.

Efforts to utilize vulcanized plugs for the above types of large-size repairs have failed, even when the plugs were provided with an enlarged retaining head of a diameter greater than that of the repair. Invariably, internal pressure would deform the plug and start it on its way out through the repair opening. The "headed" plug was found to have another disadvantage, in that the portion of the plug extending laterally beyond the limits of the repair opening and over a portion of the adjacent inner surface of the tire had a tendency to trap air or vulvanizing fluids. Either of these would destroy the bond of the covering patch.

It is desirable to utilize a plug which will conform to the repair opening for which it is prepared; this presupposes a material adaptable to the inner surface of the repair (as for example by light application of heat and pressure). For this reason, a completely vulcanized plug is not desirable, since it will already have a set, vulcanized configuration, and will further present adhesion problems.

Similarly, conventional unvulcanized repair materials do not possess the mechanical strength to allow a plug made therefrom to be physically pulled tightly into a repair opening.

A vulcanized plug of the correct size, covered or coated with a material which may later be activated to bond with the vulcanized tire materials in the repair, is feasible, but would be highly impractical: it would necessitate stocking a tremendously wide range of plug sizes, a different one for almost every repair size imaginable, a hopelessly complicated and prohibitively expensive project.

All of the aforementioned disadvantages are overcome by the present invention which utilizes a novel repair method and comprises a unique type of repair-plug in conjunction with a pre-vulcanized patch material.

The present invention makes possible the repair of large-sized tires, such as those of truck and off-the-road sizes, in a minimum amount of time, and without the necessity of cumbersome and expensive vulcanizing molds and vulcanizing airbags, and further eliminating the deleterious effect of heat on tire components. Thus, the repair method of the invention can be practiced even at small, local shops or at the job-site.

The invention further provides maximum strength at the repair, while keeping the repair area at a minimum, thus resulting in cooler operation and extended repair performance.

To this end there is provided a unique composite repair plug, preshaped from a laminated or built-up material to conform to the tire repair area, which is prepared so as to be smaller at the radially outer surface of the tire than at the radially inner face thereof, the side walls of the prepared area forming an angle of about 85° with the inner surface of the tire, or about 95° with the tread surface. A self-vulcanizing fluid is employed to trigger vulcanization between the layers or components of the plug and between the plug and the tire materials surrounding the repair area. Portions of the laminate are caused to flow slightly, providing intimate engagement between the plug and the repair area, as for example by slight heat and pressure. Finally, the inner end of the plug is shaped into a convexly shaped head with relation to the inner surface of the tire, and a repair patch is placed over the plug head.

It is accordingly an object of the present invention to provide tire repair materials and a method of utilizing them which will maintain maximum strength of the tire by maintaining the smallest possible repair.

Another object is to perfect a tire repair which may be utilized without the necessity of expensive and cumbersome equipment, which will not subject the tire to excessive amounts of heat, and which will not distort the repair area.

Yet another object of this invention is the provision of a tire repair member of unique structure, resulting in a repaired tire section of unusual uniformity and characteristics.

It is yet another object of the present invention to provide a tire repair plug which, when located in the tire, has a head portion generally convex in nature and of a diameter no greater than the maximum diameter of the plug body, protruding radially inwardly beyond the inner surface of the tire.

Additional objects and advantages will become apparent from the following description of a preferred embodiment of the invention, reference being had to the accompanying drawings, wherein FIGURES 1 through 7 are fragmentary sectional views showing the successive steps of repairing a tire in accordance with the invention, with FIGURE 7 showing the repaired tire in inflated condition;

Figure 1:
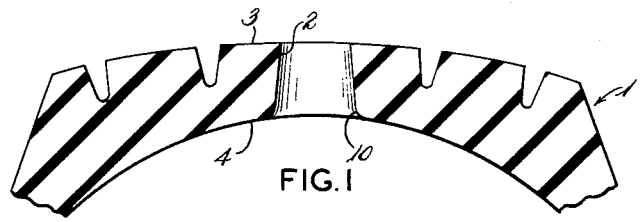

Turning now to the drawings in detail, a portion of an injured tire 1 is shown in FIGURE 1, prepared to receive a repair. The hole 2 in the tire has sidewalls sloping generally at approximately 5°, in such a manner that the opening is smaller at the outer surface 3 of the tire than at the inner tire surface 4, and with a slightly filleted shoulder 10 at its inner terminus.

Figure 10:
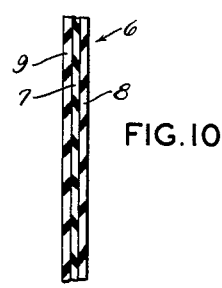
FIGURE 10 is an enlarged fragmentary sectional view taken on line 10—10 of FIGURE 8.
Figure 8:
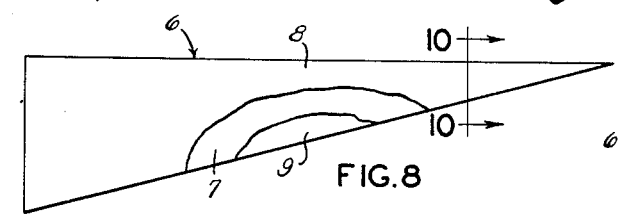
FIGURE 8 is plan view of the laminate of the repair plug of the invention prior to the rolling up thereof.
Figure 9:
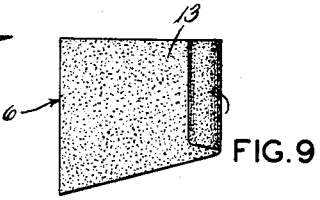
FIGURE 9 is a view similar to FIGURE 8 but showing the laminate partly rolled up.

FIGURES 8, 9 and 10 show the unique material from which the repair plug 5 is produced, namely a laminate 6 comprising a layer of precured rubber 7 which has been sandwiched between two layers of rubber 8 and 9 at the time of the precuring of layer 7. The layers 8 and 9 are so compounded that, while layer 7 cures, curing ingredients in layer 7 migrate into layers 8 and 9, producing a cure which extends partially toward the outside surfaces of layers 8 and 9, where only a slight cure is present. When it is desired to produce a repair plug from the laminate 6, both sides of it are first covered with a film 13 of self-vulcanizing liquid containing accelerators; the laminate 6, preferably cut to the triangular shape shown in FIGURE 8, is then rolled up tightly (FIGURE 9) and shaped to produce a tapering plug 5.

Figure 2:
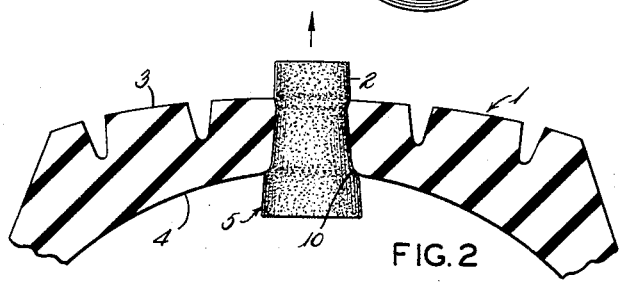

The tapering plug with its convolutions and exterior covered with the self-vulcanizing film 13, is now pulled tightly into the prepared opening 2 of the tire, small end first. As shown in FIGURE 2, the plug is now tightly compressed within the repair opening 2, with its inner end tightly engaging the fillet 10.

The ultra-accelerators of the film 13 act upon the outer portions of layers 8 and 9, thus causing the curing of these portions at room temperature; at the same time, the film, which contains vulcanizable material but is itself missing an ingredient necessary for curing, will receive that ingredient by migration and will cure. At room temperature, no cure is discernible for an hour or two. This permits the repair to be completed.

In this manner, the layers 8 and 9 and film 13 all vulcanize together and into the prepared repair opening 2.

The following is an example of a useful formulation for the central layer 7 of the laminate:

| | Parts |
|---|---|
| Natural rubber | 100 |
| Furnace carbon black | 15 |
| Zinc oxide | 15 |
| Stearic acid | 3 |
| Antioxident | 2 |
| Processing oil | 10 |
| Tackifier | 10 |
| Accelerator | .8 |
| Sulfur | 2.6 |

There follows an example of a useful formulation for the layers 8 and 9 of the laminate:

| | Parts |
|---|---|
| Natural rubber | 100 |
| Reinforcing filler | 50 |
| Zinc oxide | 12 |
| Stearic acid | 3 |
| Antioxident | 2 |
| Processing oil | 10 |
| Tackifier | 10 |
| Sulfur | 1 |

A useful formulation for the self-vulcanizing fluid 13 would be:

| | Parts |
|---|---|
| Natural rubber | 100 |
| Ultra accelerator | 20–200 |
| Activator | 10–100 |
| Solvent | 500–2000 |

Examples of ultra accelerators useful in this invention are the zinc salts of dithiocarbamate such as zinc ethylphenyl dithiocarbamate. Activators include amines such as monoethanolamine or the like as well as cyclohexylethylamine.

Satisfactory repairs have been made using a laminate which had not been coated with self-vulcanizing fluid before it was rolled up. Self-vulcanizing fluid was, however, used as the lubricant for the insertion of the tapered plug and to assure cured adhesion of the plug to the tire. Pressure, without heat, was applied by means of a clamp to firm the headed plug prior to applying the patch.

Figure 11:
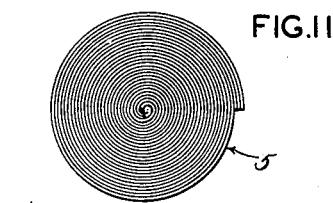
FIGURE 11 is an end view of the repair plug of the invention.
Figure 12:
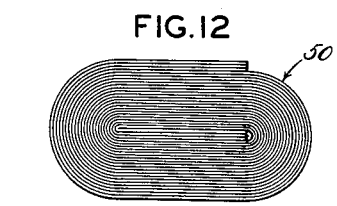
FIGURE 12 is an end view showing a modified configuration of the repair plug of the invention.

The manner in which a unified whole is produced of the laminate 6 may be seen in FIGURE 11, which shows the rolled plug 5. Where the tire injury is such that a differently shaped repair, such as an oval must be made, the plug may be started by first folding the laminate upon itself, thus producing the plug 50 shown in FIGURE 12.

Figure 3:
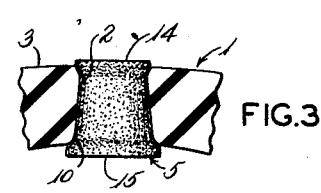

After the plug has been pulled tightly into the prepared opening in the tire, the outer end 14 thereof is trimmed off to approximately 1/8" above the outer tire surface 3, and the inner end 15 is trimmed approximately 1/4" beyond the inner tire surface 4, as shown in FIGURE 3.

Figure 4:
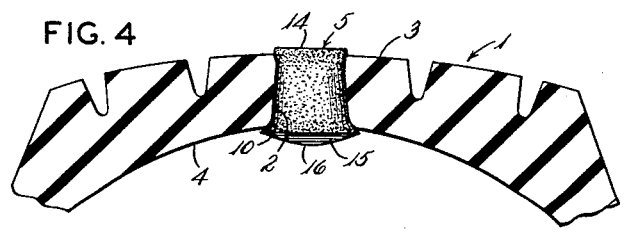

The inner end, or head, 15 of the plug 5 is trimmed and shaped with a slightly convex face 16, as shown in FIGURE 4. This and the following trimming and shaping steps are very important, since no head extending laterally over the inner tire surface must form on the inner end 15 of the plug.

Figure 5:
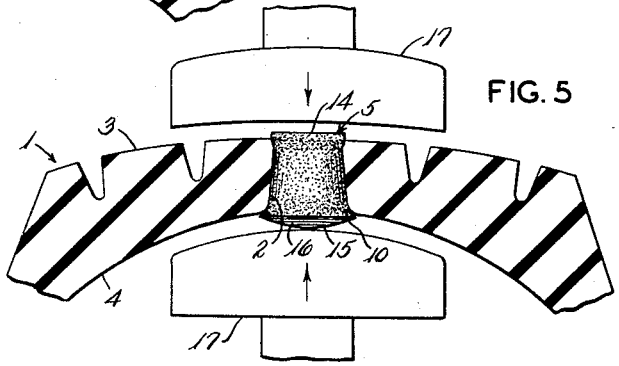

As shown in FIGURE 5, a heated clamp 17 is placed about the plug repair for a short time, providing sufficient localized heat and pressure to ensure that the plug is intimately seated and flowed into the repair opening.

The face 16 on the inner end 15 of the plug is next contoured, as for example with a buffing stone, to a final convex shape which tapers gradually to a junction with the inner surface 4 of the tire and the wall of the plug hole. The reason for this convexity will become apparent as the description proceeds.

In the finished condition of the repair, no portion of the inner end 15 of the plug extends laterally beyond the limits of the plug hole 2. The diameter of head 15 is thus no greater than, and preferably equal to, the maximum lateral dimension of the plug; in this manner, no "rivet head" is formed on the inner end of the plug, thus eliminating a source of trapped fluids.

The final step of the repair involves the application of a pre-vulcanized patch 19, comprised of a combination of rubber layers and incorporating fabric reinforcement in the nature of corded or square-woven material.

A self-vulcanizing liquid is conventionally used to adhere the patch to the inner surface of the tire and generally centered over the plug, where it is finally pressed or stitched in place.

Figure 7:
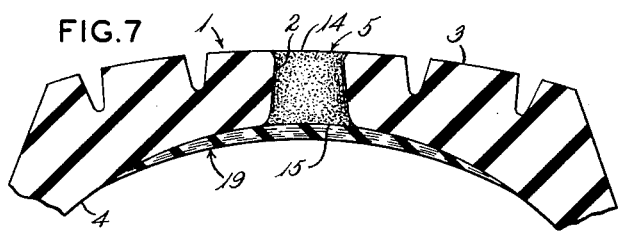
Figure 6:
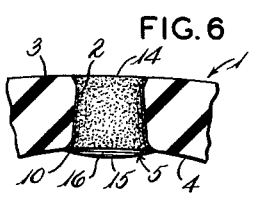

FIGURE 7 shows a portion of the repaired tire, comprising the plug 5 and patch 19, as it appears when mounted on a rim and inflated. When the tire is in this condition, it will be noted that the inflation pressure presses the inner end 15 of the plug outwardly and more intimately into the hole and locks it against the fillet or shoulder 10 and flattens the convex face of the plug. In this manner, the transition between the inner surface 4 of the tire and the plug head 15 is smooth, without step-offs, and thus no flex areas arise at the juncture of tire and plug.

It will be apparent that the surface of the tire 3, indicated above as being the road-contacting surface, may equally well be the surface to be retreaded, in which case the tire is plugged and then in readiness to be prepared for a new rubbery tread surface.

Whereas a preferred form of the invention has been disclosed herein, other modifications and variations will occur to those skilled in the art without departing from the scope of this invention.

What is claimed is:

1. A method of repairing a tire, comprising
   (a) forming an outwardly narrowing opening in said tire,
   (b) forming a sealing plug by rolling a strip of laminated rubbery material upon itself to form a con-voluted plug,
   (c) wedging said plug firmly in said opening with one end projecting beyond the inner surface of said tire,
   (d) trimming the edge of said end flush with the edge of said opening,
   whereby, when said tire is inflated, the fluid pressure compresses said plug tightly in said opening and presses said end into substantial lateral alignment with the said inner surface of said tire.

2. A method of repairing a tire, comprising
   (a) forming an outwardly narrowing opening in said tire,
   (b) forming a sealing plug by coating the surfaces of a strip of laminated rubber with a self-curing fluid and rolling the strip upon itself to form a spirally wound plug,
   (c) wedging said plug firmly in said opening with one end projecting beyond the inner surface of said tire,
   (d) trimming the edge of said end flush with the edge of said opening,
   whereby, when said tire is inflated, the fluid pressure compresses said plug tightly in said opening and presses said end into substantial lateral alignment with the said inner surface of said tire.

3. A method of repairing a tire, comprising
   (a) forming an outwardly narrowing opening in said tire,
   (b) inserting a tapered, rubbery plug, small end first, outwardly into said opening,
   (c) wedging said plug firmly in said opening with one end thereof projecting beyond the inner surface of said tire,
   (d) forming on said plug-end a head of a lateral dimension no greater than that of said plug end,
   whereby, when said tire is inflated, the fluid pressure seats said plug tightly in said opening and presses said plug-head into substantial lateral alignment with the said inner surface of said tire.

4. A method as in claim 3, wherein said head is formed rounded.

5. A method as in claim 3, wherein said head is formed convex.

6. A method of repairing a tire, comprising
   (a) forming an outwardly narrowing opening in said tire,
   (b) pulling a tapered, rubbery plug, small end first, outwardly into said opening,
   (c) wedging said plug firmly in said opening with one end thereof projecting beyond the inner surface of said tire,
   (d) forming on said plug-end a convexly rounded head of a lateral dimension equal to that of said plug-end and merging with said inner surface of said tire,
   whereby, when said tire is inflated, the fluid pressure within said tire compresses said plug tightly in said opening and flattens said plug head into substantial lateral alignment with the said inner surface of said tire.

7. A method of repairing a tire, comprising
   (a) forming an outwardly narrowing opening in said tire,
   (b) inserting a tapered, rubbery plug, small end first, outwardly into said opening,
   (c) wedging said plug firmly in said opening with one end thereof projecting beyond the inner surface of said tire,
   (d) forming on said plug-end a head of a lateral dimension no greater than that of said plug-end,
   whereby, when said tire is inflated, the fluid pressure seats said plug tightly in said opening and flattens said plug-head into substantial lateral alignment with the said inner surface of said tire.

8. A method of repairing a tire, comprising
   (a) forming an outwardly narrowing opening in said tire,
   (b) inserting a tapered, rubbery plug, small end first, outwardly into said opening, (c) wedging said plug firmly in said opening with one end thereof projecting beyond the inner surface of said tire, (d) forming on said plug-end a head of a lateral dimension no greater than that of said plug-end, (e) placing a reinforced patch on the said inner surface of said tire and over said plug-end, whereby, when said tire is inflated, the fluid pressure seats said plug tightly in said opening and flattens said plug-head into substantial lateral alignment with the said inner surface of said tire.

9. A method of repairing a tire, comprising (a) forming in said tire an outwardly narrowing opening tapering at about 5°, (b) inserting a tapered, rubbery plug, small end first, outwardly into said opening, (c) wedging said plug firmly in said opening with one end thereof projecting beyond the inner surface of said tire, (d) forming on said plug-end a head of a lateral dimension no greater than that of said plug-end, whereby, when said tire is inflated, the fluid pressure compresses said plug tightly in said opening and presses said plug-head into substantial alignment with the said inner surface of said tire.

10. A tire repair comprising (a) a tire portion having a well defining an outwardly narrowing opening, (b) a sealing plug fixed in said opening, (1) one end of said plug normally projecting beyond the inner surface of said tire portion and having its edge formed flush with the edge of said opening, whereby, when said tire in inflated, the fluid pressure compresses said plug tightly against said wall and presses said end into substantial lateral alignment with said inner surface of said tire.

11. A tire repair as in claim 10 and a reinforced patch on said inner surface of said tire and over said plug-end.

12. A tire repair as in claim 10, wherein said plug-end terminates in a rounded head.

13. A tire repair as in claim 11, wherein said plug-end terminates in a convex head.

14. A tire repair comprising (a) a tire portion having a wall defining an outwardly narrowing opening, (b) a sealing plug tapering generally in the direction of said wall and fixed in said opening, (1) one end of said plug terminating in a head projecting beyond the inner surface of said tire portion, said head having a lateral dimension no greater than that of said plug-end, whereby, when said tire is inflated, the fluid pressure compresses said plug tightly against said wall and presses said head into substantially lateral alignment with said inner surface of said tire.

15. A tire repair as in claim 14, wherein said sealing plug comprises a laminate spirally wound upon itself.

16. A tire repair as in claim 15, wherein said laminate comprises a rubbery vulcanized center sandwiched between rubbery layers having vulcanizable outer surfaces.

17. A tire repair as in claim 15, wherein the surfaces of said laminate are coated with a self-vulcanizing material.

18. A tire repair as in claim 15, wherein said wound laminate is coated with a self-curing material.

19. A tire repair comprising (a) a tire portion having a wall tapering at about 5° defining an outwardly narrowing opening, (b) a sealing plug tapering generally in the direction of said wall and fixed in said tapering opening, (1) one end of said plug terminating in a head projecting beyond the inner surface of said tire portion, said head having a lateral dimension no greater than that of said plug-end, whereby, when said tire is inflated, the fluid pressure compresses said plug tightly against said wall and presses said head into substantial lateral alignment with said inner surface of said tire.

20. A tire repair comprising (a) a tire portion having an outwardly narrowing opening defined by a wall terminating at its inner end in a filleted portion, (b) a sealing plug tapering generally in the direction of said wall and fixed in said opening, (1) one end of said plug terminating in a head projecting beyond the inner surface of said tire portion, said head having a lateral dimension no greater than that of said plug-end, whereby, when said tire is inflated, the fluid pressure compresses said plug tightly against said wall and said filleted portino and presses said head into substantial lateral alignment with said inner surface of said tire.

21. A method of forming a tire sealing plug, comprising forming a laminate having a vulcanized lamina sandwiched between laminate with vulcanizable outer surfaces, applying a coat of self-vulcanizing material to the surfaces of said laminate, winding said laminate upon itself to form a convoluted member and vulcanizing said outer surfaces while causing vulcanization in said coat.

22. A method of forming a tire sealing plug as in claim 21, and coating said convoluted member with a self-vulcanizing material.

23. A convoluted, rubbery sealing plug adapted to fully vulcanize in a tire, and comprising a vulcanized lamina between laminate having vulcanizable outer surfaces.

24. A sealing plug as in claim 23, and a covering of self-vulcanizing material on said outer surfaces of said laminate.

25. A sealing plug as in claim 23, and a covering of self-vulcanizing material on the outer surface of said plug.

References Cited in the file of this patent

UNITED STATES PATENTS

| | | |
|---|---|---|
| 466,169 | Hume | Dec. 29, 1891 |
| 1,562,577 | Moneuse | Nov. 24, 1925 |
| 2,229,878 | Wilson | Jan. 28, 1941 |
| 3,016,319 | Halverscheid | Jan. 9, 1962 |

UNITED STATES PATENT OFFICE
CERTIFICATE OF CORRECTION

Patent No. 3,143,156                                     August 4, 1964

George Clarke Fagert et al.

It is hereby certified that error appears in the above numbered patent requiring correction and that the said Letters Patent should read as corrected below.

Column 7, line 27, for "well" read -- wall --; line 34, for "in" read -- is --; line 55, for "substantially" read -- substantial --; column 8, line 32, for "portino" read -- portion --; lines 36 and 50, for "laminate", each occurrence, read -- laminae --.

Signed and sealed this 8th day of December 1964.

(SEAL)
Attest:

ERNEST W. SWIDER
Attesting Officer

EDWARD J. BRENNER
Commissioner of Patents